(12) United States Patent
Sinha

(10) Patent No.: US 12,382,141 B2
(45) Date of Patent: Aug. 5, 2025

(54) CALLER IDENTIFICATION FOR A DESTINATION WIRELESS USER EQUIPMENT

(71) Applicant: Charter Communications Operating, LLC, St. Louis, MO (US)

(72) Inventor: Ashutosh Kumar Sinha, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/425,885

(22) Filed: Jan. 29, 2024

(65) Prior Publication Data

US 2024/0171824 A1  May 23, 2024

Related U.S. Application Data

(63) Continuation of application No. 17/697,356, filed on Mar. 17, 2022, now Pat. No. 11,924,514.

(51) Int. Cl.
  *H04N 21/478*  (2011.01)
(52) U.S. Cl.
  CPC ................... *H04N 21/478* (2013.01)
(58) Field of Classification Search
  None
  See application file for complete search history.

(56) References Cited

U.S. PATENT DOCUMENTS

| | | | |
|---|---|---|---|
| 6,243,373 B1 | 6/2001 | Turock | |
| 2006/0256752 A1* | 11/2006 | Svensson | H04L 65/1104 370/331 |
| 2007/0263808 A1 | 11/2007 | Van Wyk et al. | |
| 2009/0328118 A1* | 12/2009 | Ravishankar | H04M 3/42042 725/106 |
| 2014/0153705 A1* | 6/2014 | Moore | G06F 40/103 704/235 |

OTHER PUBLICATIONS

Author Unknown, "Activate Caller ID for Phone and U-Verse TV", Last Updated: Apr. 3, 2018, Retrieved from Internet: https://www.att.com/support/article/u-verse-voice/KM1040428/, 2 pages.
Non-Final Office Action for U.S. Appl. No. 17/697,356, mailed Jun. 14, 2023, 16 pages.
Notice of Allowance and Notice of Allowability for U.S. Appl. No. 17/697,356, mailed Oct. 31, 2023, 8 pages.

* cited by examiner

*Primary Examiner* — William J Kim
(74) *Attorney, Agent, or Firm* — Dority & Manning, P.A.

(57) ABSTRACT

Various embodiments disclosed herein provide for a caller identification (ID) method and system that can provide caller ID information to display on devices other than the wireless equipment device that is receiving the phone call. This can include televisions and other streaming devices associated with the user receiving the phone call. The mobile wireless network associated with the user's wireless user equipment can determine whether the user has an additional device on which caller ID is to be displayed, and then identify a media server associated with the additional device. Once identified, the mobile wireless network can provide the media server with the caller ID information so that it can be displayed on the television or other streaming device.

18 Claims, 5 Drawing Sheets

CALLER IDENTIFICATION FOR A DESTINATION WIRELESS USER EQUIPMENT

RELATED APPLICATION

This application is a continuation of co-pending U.S. patent application Ser. No. 17/697,356, filed on Mar. 17, 2022, entitled "CALLER IDENTIFICATION FOR A DESTINATION WIRELESS USER EQUIPMENT," the disclosure of which is hereby incorporated herein by reference in its entirety.

BACKGROUND

Caller Identification (ID) is a service that transmits a telephone number of a calling user equipment (UE), and occasionally a name associated with the calling UE, to a destination UE to which the call is addressed. This can enable a person receiving the phone call to see identification information about the caller before answering the phone.

SUMMARY

In various embodiments, a method can include receiving, by a computing device comprising a processor device, a first notification of an incoming call to a wireless user equipment, wherein the first notification comprises subscriber information related to a subscriber of the wireless user equipment. The method can also include determining, based on the subscriber information, that a subscriber destination device is associated with the subscriber. The method can also include determining an address of a media server of a plurality of media servers that provides service to the subscriber destination device. The method can also include transmitting a second notification comprising caller identification information to the media server.

In another embodiment, a computer system can include one or more computing devices comprising one or more processor devices, where the one or more processor devices are configured to receive a first notification of an incoming call to a wireless user equipment, wherein the first notification comprises subscriber information related to a subscriber of the wireless user equipment. The one or more processor devices can also be configured to determine, based on the subscriber information, that a subscriber destination device is associated with the subscriber. The one or more processor devices can also be configured to determine an address of a media server of a plurality of media servers that provides service to the subscriber destination device. The one or more processor devices can also be configured to transmit a second notification comprising caller identification information to the media server.

In an embodiment, a non-transitory computer-readable storage medium includes executable instructions configured to cause a processor device to receive a first notification of an incoming call to a wireless user equipment, wherein the notification comprises subscriber information related to a subscriber of the wireless user equipment. The instructions can further cause the processor device to determine, based on the subscriber information, that a subscriber destination device is associated with the subscriber. The instructions can further cause the processor device to determine an address of a media server of a plurality of media servers that provides service to the subscriber destination device. The instructions can further cause the processor device to transmit a second notification comprising caller identification information to the media server.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
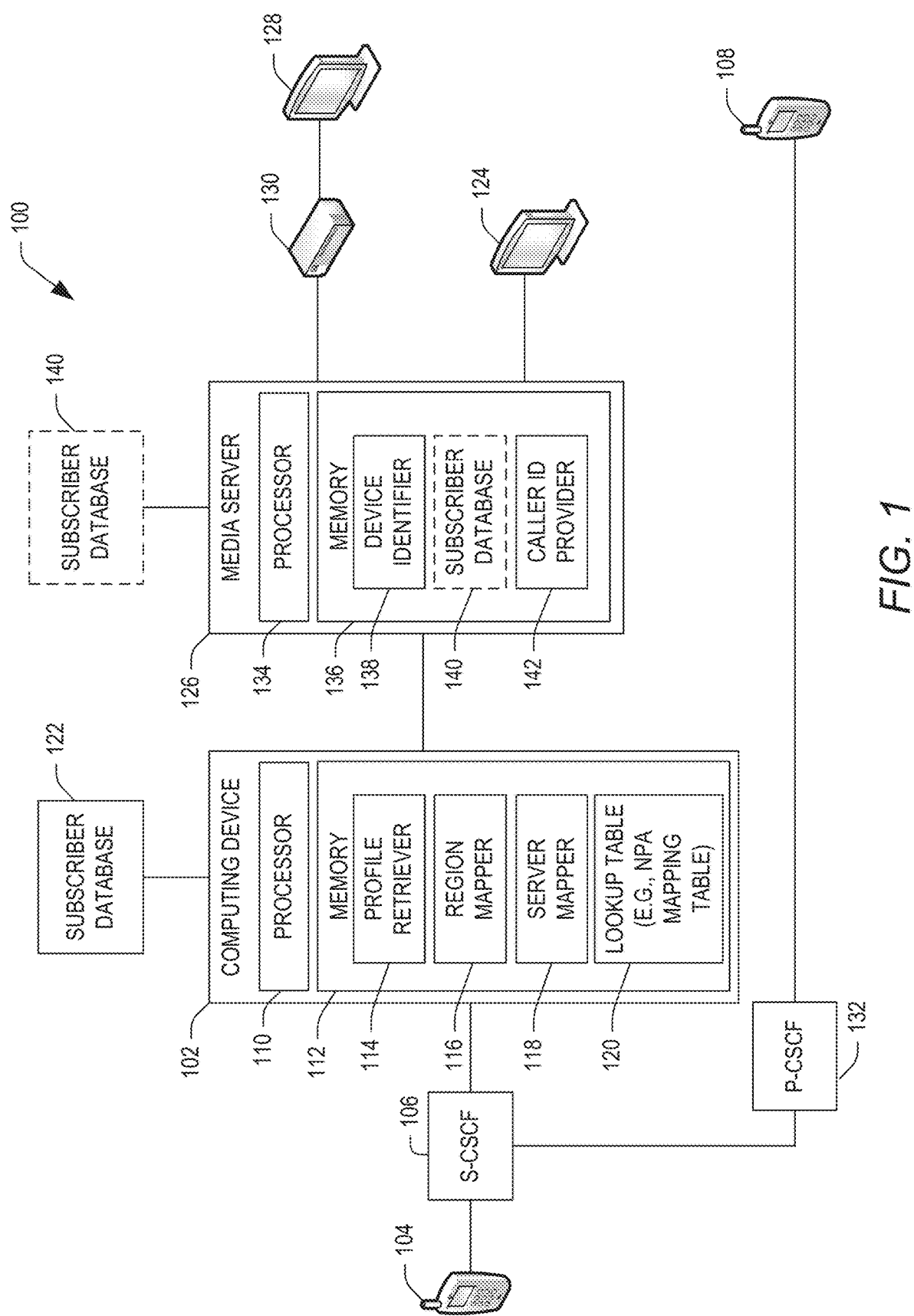
FIG. 1 illustrates a block diagram of an example computing system for implementing caller identification (ID) for a wireless user equipment (UE) in accordance with various aspects and embodiments of the subject disclosure.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Various embodiments disclosed herein provide for a caller identification (ID) method and system that implement caller ID for a wireless user equipment (UE), such as wireless mobile phones. In some embodiments, caller ID information is provided for display on devices other than the wireless UE to which the call is directed. Such devices can include televisions and other streaming or display devices associated with a subscriber associated with the wireless UE. The mobile wireless network associated with the wireless UE can determine whether the subscriber has an additional device on which caller ID is to be displayed, and can identify a media server associated with the additional device. Once identified, the mobile wireless network can provide the media server with the caller ID information so that the caller ID information can be displayed on the television or other streaming device.

The subject disclosure provides a method and system whereby caller ID information can be provided to televisions or streaming devices for display for phone calls directed to a wireless UE (e.g., mobile phone, cellular phone, and etc.).

An Internet Protocol (IP) multimedia subsystem (IMS) of a mobile wireless network can include one or more servers or computing devices that can receive an incoming phone call and, based on the telephone number to which the incoming phone call is directed, look up subscriber information and determine whether the subscriber has requested that caller ID services be provided to a subscriber destination device, such as a television device or a streaming device. If the subscriber information indicates that the subscriber has requested caller ID services, the server or computing device can determine an address of a media server that provides services to the television or streaming device (e.g., streaming feeds, scheduling information, cable guide channels, etc.), and the media server can identify a subscriber destination device to which the caller ID information is to be sent.

Turning now to FIG. 1, illustrated is an example computing system 100 for implementing caller identification (ID) for a wireless user equipment (UE) in accordance with various aspects and embodiments of the subject disclosure. The computing system 100 can include a computing device 102 that receives a notification of a phone call made by user equipment (UE) 104 (sometimes referred to herein as the "calling" UE 104) via a Serving—Call Session Control Function (S-CSCF) node 106 of a 3$^{rd}$ Generation Partnership Project (3GPP) compliant mobile wireless network. In an embodiment, the notification can be in the form of a Session Initiation Protocol (SIP) INVITE message (sometimes referred to herein as a call notification message) that is sent from the calling UE 104 to a called UE 108 (sometimes referred to herein as the destination UE 108) and includes information about the calling UE 104 and the called UE 108, such as a destination address of the called UE 108. The destination address may comprise, by way of non-limiting example, a telephone number of the called UE 108.

The computing device 102 can include a processor device 110 that can perform several operations in response to executing computer-executable instructions stored in a memory 112. The computer-executable instructions can include a profiler retriever 114, a region mapper 116, and a server mapper 118. A lookup table 120 can also be included in the memory 112. In some embodiments, the lookup table 120 may comprise, by way of non-limiting example, a Number Planning Area (NPA) mapping table.

The S-CSCF node 106 can forward a call notification message to the computing device 102, and the profile retriever 114 can retrieve subscriber information related to the UE 108 from a subscriber database 122. Based on information in the subscriber information, where the subscriber information can be a phone number (e.g., the Mobile Station International Subscriber Directory Number) or other identifying information, the profile retriever 114 can send a request to the subscriber database 122 to retrieve profile information about the subscriber. In an embodiment, the request to the subscriber database 122 can take the form of a User Data Request (UDR) message, and the reply from the subscriber database 122 can take the form of a User Data Answer (UDA) message.

The profile information retrieved by the profile retriever 114 can include a field that indicates whether the subscriber has a subscriber destination device (e.g., third-party devices other than the UE 108 on which to display caller ID information). The streaming devices (e.g., streaming device 124) could be televisions, tablets, or computers that receive video streaming content directly from a media server 126 or are otherwise communicatively coupled to the media server 126. In other embodiments, the subscriber destination device could be a television or display device 128 that receives content via a cable set top box 130, or from a streaming device, such as a Roku® streaming device, an AppleTV® streaming device, a Chromecast® streaming device, or the like. The caller ID information for the call that is incoming to the UE 108 from the UE 104 can be displayed on the streaming device 124 or the television 128. This can enable a user to determine who is calling the user's UE 108 even if the UE 108 is not currently nearby the user.

In an embodiment, the field can be binary, where a first value indicates that there is no device on which to display caller ID information and a second value indicates that there is a device on which to display caller ID information. In an embodiment, the field can also include routing information related to the device on which to display the caller ID information (e.g., the streaming device 124 or television 128).

In an embodiment where the profile information comprises the first value indicating that there is no subscriber destination device, the computing device 102 does not send any caller ID information, but instead, the call from the UE 104 proceeds to the UE 108 via the S-CSCF node 106 and a Proxy Call Session Control Function (P-CSCF) node 132.

In an embodiment where the profile information comprises the second value indicating that there is a subscriber destination device, the computing device 102 can proceed with determining where to send the caller ID information to facilitate presentation of the caller ID information on the subscriber destination device.

The region mapper 116 can determine a region associated with the subscriber using the lookup table 120, such as an NPA mapping table, and based on the region, the server mapper 118 can identify an address of a media server (e.g., the media server 126) associated with the subscriber from a plurality of media servers. An NPA prefix of a telephone number is commonly called an area code and is the three-digit number that identifies the telephone service region. The region mapper 116 can determine the NPA number based on the notification received via the S-CSCF node 106 (e.g., the SIP:Invite message). The notification can comprise a field that contains the number being called (e.g., the phone number associated with UE 108.

The lookup table 120 can, in some embodiments, comprise two separate tables, including an NPA-to-Region mapping table where NPA prefixes are mapped to regions, and then a region-to-video-endpoint mapping table where there are addresses or routing information to media servers associated with the regions. The region mapper 116 can identify the region based on the area code of the phone number being called, and then, the server mapper 118 can determine the routing information or address of the media server 126 based on the region identified.

In an embodiment, the address of the media server 126 can be a SIP uniform resource identifier (URI), and the IMS Domain Name System (DNS) of the mobile wireless network associated with the computing device 102 can be used to route a notification to the media server 126. The notification routed to the media server 126 from the computing device 102 can, in an embodiment, be a SIP:NOTIFY message that comprises information about the subscriber being called, such as the phone number, name, address, and/or other identifying information. The SIP:NOTIFY message can also include the caller ID information to identify the subscriber associated with the UE 104.

The media server 126 can include a processor device 134 that can perform several operations in response to executing computer-executable instructions stored in a memory 136. The computer-executable instructions can include those related to a device identifier 138 and a caller ID provider 142. In at least some embodiments, a subscriber database 140 can also be stored in the memory 136, and in other embodiments, the subscriber database 140 can be located and/or stored elsewhere.

In an embodiment, the device identifier 138 can determine an address of or routing information to the streaming device 124, the cable set top box 130, or the television 128 based on information included in the SIP:NOTIFY message received from the computing device 102. The device identifier can match a phone number or other identifying information in the SIP:NOTIFY message to subscriber information or to a Media Access Controller (MAC) address in the subscriber database 140, and identify the IP address, routing information, or SIP URI to the subscriber destination device which can facilitate the display of the caller ID information on a display of the subscriber destination device. The caller ID provider 142 can transmit the caller ID information to the subscriber destination device.

Because the profile retriever 114, region mapper 116, server mapper 118, device identifier 138, and caller ID provider 142 are components of the computing device 102 and the media server 126, functionality implemented by the profile retriever 114, region mapper 116, and server mapper 118 may be attributed to the computing device 102, and functionality implemented by the device identifier 138 and caller ID provider 142 may be attributed to the media server 126 generally. Moreover, in examples where the profile retriever 114, region mapper 116, server mapper 118, device identifier 138, and caller ID provider 142 comprise software instructions that program the processor devices 110 and 134 to carry out functionality discussed herein, functionality implemented by the profile retriever 114, region mapper 116, server mapper 118, device identifier 138, and caller ID provider 142 may be attributed herein to the processor devices 110 and 134, or to the computing device 102 and the media server 126 more generally.

Figure 2:
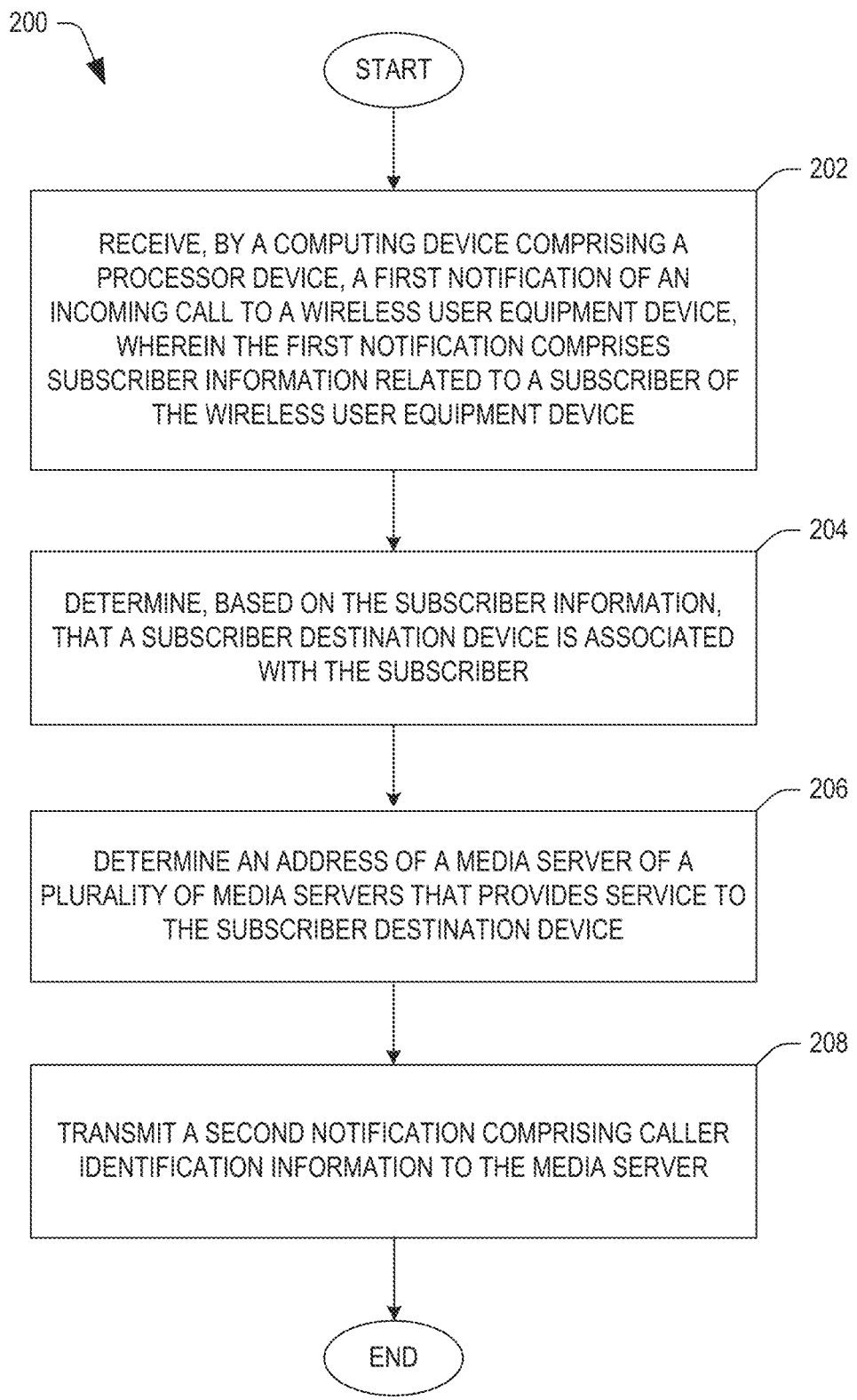
FIG. 2 illustrates a flowchart of an example method for providing caller ID for a wireless destination UE in accordance with various aspects and embodiments of the subject disclosure.

FIG. 2 illustrates a process in connection with the aforementioned system 100. FIG. 2 will be discussed in conjunction with FIG. 1. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 2, illustrated is an example method 200 for providing caller ID for a wireless destination UE in accordance with various aspects and embodiments of the subject disclosure.

At step 202, the method 200 can include receiving, by the computing device 102, a first notification of an incoming call to the wireless UE 108, wherein the first notification comprises subscriber information related to a subscriber of the wireless UE 108.

At step 204, the method can include determining, based on the subscriber information, that the subscriber destination device 124 is associated with the subscriber. Determining that the subscriber destination device 124 is associated with the subscriber can further include transmitting a request message to the subscriber database 122 for profile information related to the wireless UE 108 and receiving, from the subscriber database 122, an answer message that comprises a subscriber destination device caller identification flag. The subscriber database 122 can be a home subscriber server (HSS) of a mobile wireless network, and the computing device can be a telephony application server.

At step 206, the method can include determining an address of a media server (e.g., the media server 126) of a plurality of media servers that provides service to the subscriber streaming device 124. Determining the address of the media server 126 can further include matching, based on the lookup table 120 (e.g., NPA mapping table), a numbering plan area prefix of the subscriber information to a region name and matching, based on the lookup table, the region name to the address of the media server associated with the region name.

At step 208, the method can include transmitting a second notification comprising caller identification information to the media server 126.

Figure 3:
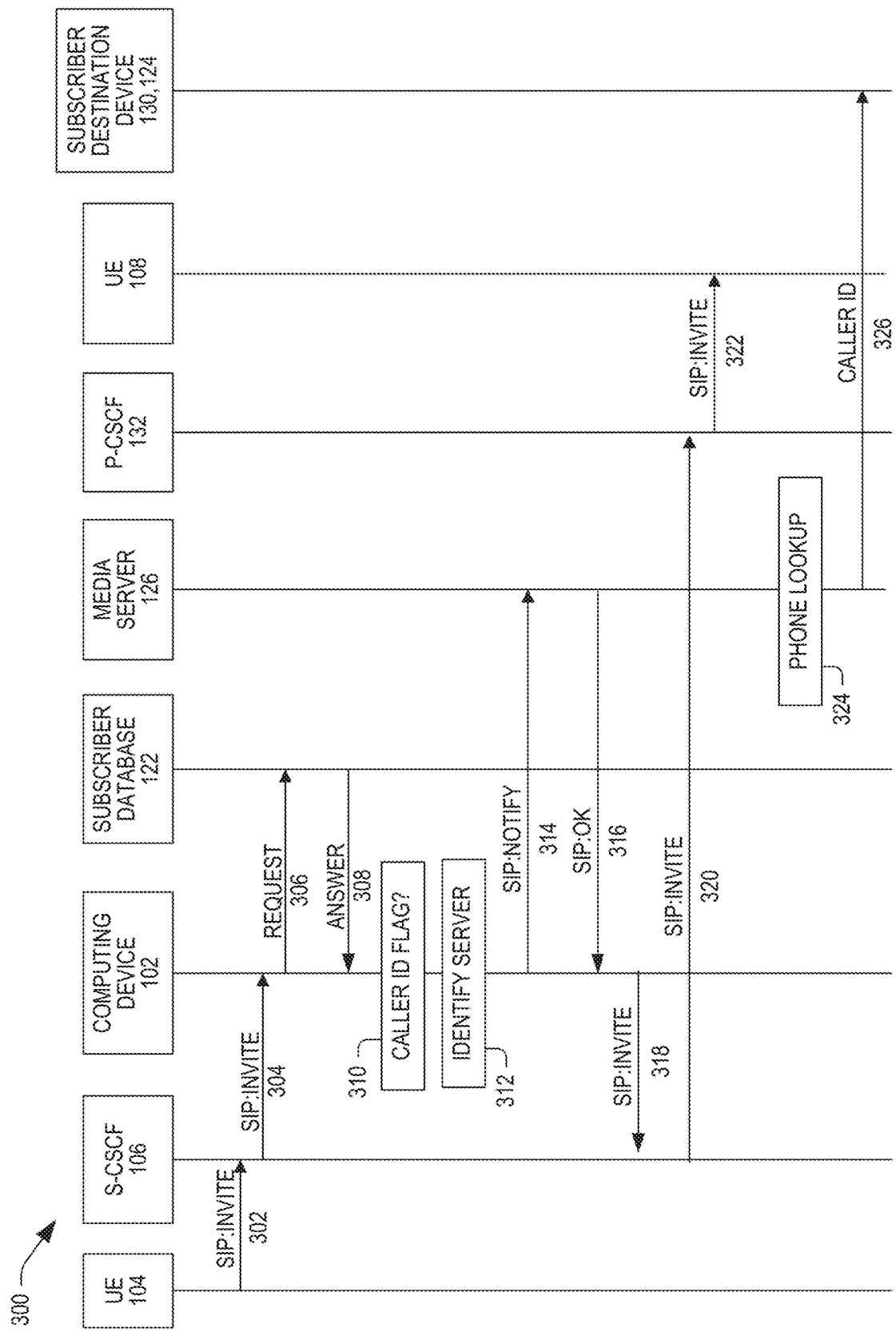
FIG. 3 illustrates an example message sequence diagram for implementing caller ID for a wireless destination UE in accordance with various aspects and embodiments of the subject disclosure.

Turning now to FIG. 3, illustrated is an example message sequence diagram 300 for implementing caller ID for a wireless destination UE in accordance with various aspects and embodiments of the subject disclosure.

The message sequence can start at 302 when the UE 104 initiates a phone call to the UE 108. The S-CSCF node 106 can receive from the UE 104 a SIP:INVITE notification comprising a number of fields including, but not limited to, the phone number of UE 104 and other identifying information related to UE 104 as well as the phone number of UE 108. The S-CSCF node 106 can be part of the same mobile wireless network as UE 104 or can be in the same mobile wireless network as UE 108 if UE 104 and UE 108 are in different networks.

At 304, the S-CSCF node 106 can forward the SIP:INVITE notification to the computing device 102 where the computing device 102 can extract, from the SIP:INVITE message, subscriber information about the UE 108 (e.g., phone number) and, at 306, send a request to the subscriber database 122 to retrieve profile information about the subscriber. The request, at 306, can be in the form of a UDR message, and the subscriber database 122 can respond to the computing device 102 at 308 in the form of a UDA message. In an embodiment, the subscriber database 122 can be an HSS of the mobile wireless network to which the UE 108 belongs.

Based on the answer message at 308, the computing device at 310 can determine whether the profile information indicates whether the subscriber-associated UE 108 has a subscriber destination device to which caller ID information is to be delivered. The profile information can include a caller ID flag field where a first value (e.g., "0") can indicate that there is no subscriber destination device, and where a second value (e.g., "1") can indicate that there is a subscriber destination device to which caller ID information is to be delivered.

In response to the computing device 102 determining that there is a subscriber destination device at 310, at 312, the computing device 102 can identify a media server (e.g., the media server 126) to which the caller ID information is to be sent. At 312, the computing device can determine a region associated with the subscriber using a Number Planning Area (NPA) mapping table, and based on the region, the computing device 102 can identify an address of a media server (e.g., the media server 126) associated with the subscriber from a plurality of media servers.

The NPA mapping table can in some embodiments comprise two separate tables, including an NPA-to-Region mapping table where NPA prefixes are mapped to regions, and then a region-to-video-endpoint mapping table where there are addresses or routing information to media servers associated with the regions. The computing device 102 can identify the region based on the area code of the phone number being called, and then the computing device 102 can determine the routing information or address of the media server 126 based on the region identified.

Once the address or routing information of the media server 126 is determined, the computing device 102 can send a SIP:NOTIFY notification at 314 to the media server 126, with caller ID information related to the phone call from the UE 104. The media server 126 can send an acknowledgement back to the computing device 102 as a SIP:OK message at 316, and then the computing device 102 can respond to the S-CSCF node 106 with a SIP:INVITE message at 318 confirming the caller ID information was delivered to the media server 126.

Concurrent with the message sequence 314, 316, and 318, at 320 the S-CSCF node 106 can send a SIP:INVITE message to the P-CSCF node 132 associated with the UE 108. This is sent concurrently so that there is little to no delay in the phone call connection being made between the UE 104 and the UE 108 while the caller ID information is being delivered. The P-CSCF node 132 can then send the SIP:INVITE message at 322 to the UE 108.

Concurrently, the media server 126 performs a lookup at 324 based on the phone number of the UE 108 in order to look up a MAC address or other routing information associated with the subscriber destination device (e.g., the cable set top box 130 or the television 128 or other streaming device 124). Once the MAC address or routing information is identified, the media server 126 can send the caller ID information at 326 to the subscriber destination device.

Figure 4:
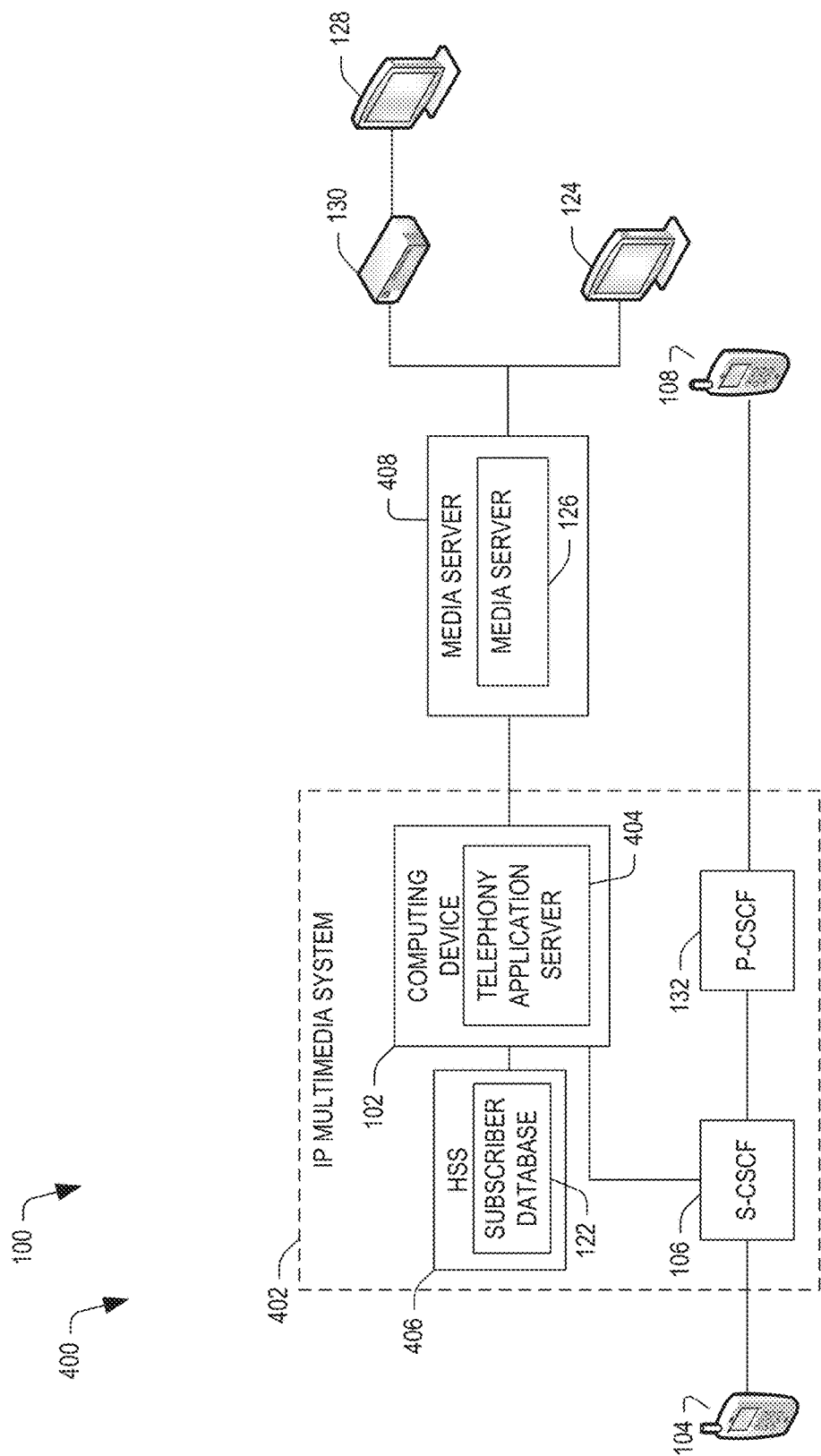
FIG. 4 illustrates an example block diagram showing the computer system illustrated in FIG. 1 in the context of a wireless network architecture in accordance with various aspects and embodiments of the subject disclosure.

Turning now to FIG. 4, illustrated is an example block diagram showing the computer system 100 in the context of a wireless network architecture 400 in accordance with various aspects and embodiments of the subject disclosure.

In an embodiment, the computing device 102, the S-CSCF node 106, the P-CSCF node 132, and the subscriber database 122 can be a part of an IP Multimedia System (IMS) 402 of a mobile wireless network. The computing device 102 can be operating a telephony application server 404 that is a component in the core network of a mobile wireless network to provide telephony application and other additional multimedia functions. In an embodiment, the subscriber database 122 can be part of an HSS 406 that can provide subscriber and profile information to other entities within the IMS 402.

In an embodiment, the media server 126 can be hosted on a computing device 408 that provides content to subscriber destination devices such as the television or other streaming devices 124, or the cable set top box 130. The content can include streaming video content or can include scheduling and channel guide information.

Figure 5:
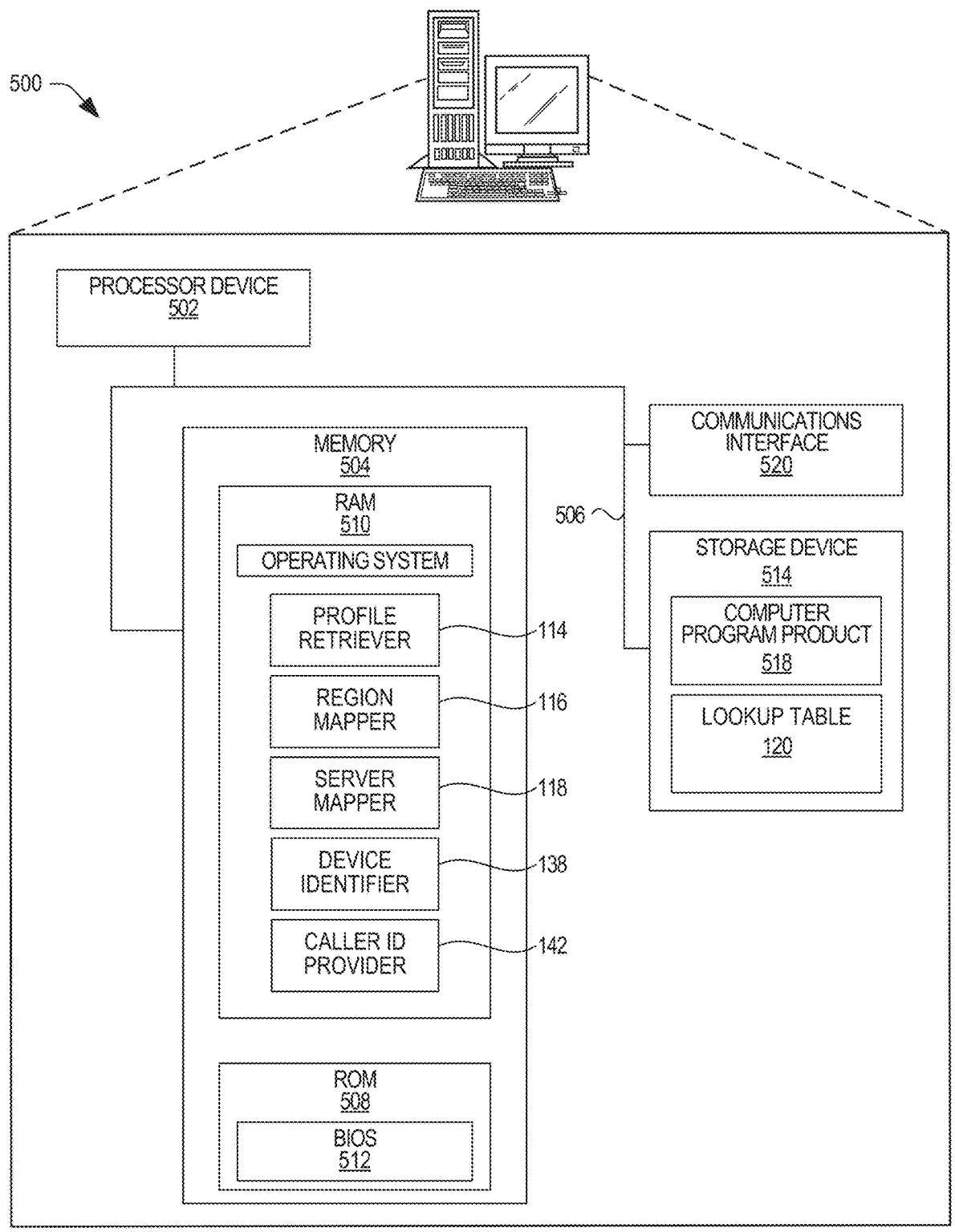
FIG. 5 illustrates an example block diagram of a computer that can be operable to execute processes and methods in accordance with various aspects and embodiments of the subject disclosure.

FIG. 5 is a block diagram of a computing device 500 suitable for implementing the computing device 102 and/or the media server 126, according to one example. The computing device 500 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 500 includes a processor device 502, a system memory 504, and a system bus 506. The system bus 506 provides an interface for system components including, but not limited to, the system memory 504 and the processor device 502. The processor device 502 can be any commercially available or proprietary processor.

The system bus 506 may be any of several types of bus structures that may further interconnect to a memory bus (with or without a memory controller), a peripheral bus, and/or a local bus using any of a variety of commercially available bus architectures. The system memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)). A basic input/output system (BIOS) 512 may be stored in the non-volatile memory 508 and can include the basic routines that help to transfer information between elements within the source computing device 500. The volatile memory 510 may also include a high-speed RAM, such as static RAM, for caching data.

The computing device 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 514 and in the volatile memory 510, including an operating system and one or more components, such as the profile retriever 114, the region mapper 116, and the server mapper 118 if the computing device 500 is implementing the computing device 102, and the device identifier 138 and the caller ID provider 142 if the computing device 500 is implementing the media server 126. Such components may implement the functionality described herein in whole or in part. It is to be appreciated that the examples can be implemented with various commercially available operating systems or combinations of operating systems.

The lookup table 120 can also be stored in the storage device 512. All or a portion of the examples may be implemented as a computer program product 518 stored on a transitory or non-transitory computer-usable or computer-readable storage medium, such as the storage device 514, which includes complex programming instructions, such as complex computer-readable program code, to cause the processor device 502 to carry out the steps described herein. Thus, the computer-readable program code can comprise software instructions for implementing the functionality of the examples described herein when executed on the processor device 502.

The computing device 500 may also include a communications interface 520 suitable for communicating with a mobile wireless network or other computing devices as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
receiving, by a media server that provides service to a subscriber destination device associated with a subscriber of wireless user equipment from a computing device configured to receive a notification of an incoming call to the wireless user equipment, a session initiation protocol (SIP) notify message that includes subscriber information;
transmitting, by the media server based on the SIP notify message, an acknowledgment comprising an SIP OK message to the computing device that causes the incoming call to proceed; and
concurrent with transmitting the acknowledgment comprising the SIP OK message to the computing device that causes the incoming call to proceed, sending, by the media server based on the SIP notify message, caller identification information to the subscriber destination device.

2. The method of claim 1, further comprising:
performing, based on a phone number associated with the wireless user equipment, a lookup of routing information associated with the subscriber destination device; and
sending, based on the routing information, the caller identification information to the subscriber destination device.

3. The method of claim 2, further comprising:
extracting the phone number from the SIP notify message, wherein the subscriber information comprises the phone number.

4. The method of claim 2, wherein the routing information comprises an address of the subscriber destination device.

5. The method of claim 1, further comprising:
extracting the caller identification information from the SIP notify message.

6. The method of claim 1, wherein sending, based on the SIP notify message, the caller identification information to the subscriber destination device comprises transmitting the caller identification information to the subscriber destination device to facilitate display of the caller identification information on the subscriber destination device.

7. The method of claim 1, wherein the subscriber destination device comprises one or more of a television, a display device that receives content through a cable set top box, or a display device that receives content from a streaming device.

8. The method of claim 1, wherein the subscriber destination device is a different device than the wireless user equipment.

9. The method of claim 1, wherein the subscriber information comprises a phone number associated with the wireless user equipment.

10. The method of claim 1, wherein the computing device comprises a telephony application server of a mobile wireless network.

11. The method of claim 1, wherein the caller identification information identifies the subscriber of wireless user equipment calling the wireless user equipment.

12. A computer system comprising:
one or more computing devices that provide service to a subscriber destination device associated with a subscriber of wireless user equipment, the one or more computing devices comprising one or more processor devices, the one or more processor devices configured to:
receive, from a computing device configured to receive a notification of an incoming call to wireless user equipment, a session initiation protocol (SIP) notify message that includes subscriber information;
transmit, based on the SIP notify message, an acknowledgment comprising an SIP OK message to the computing device that causes the incoming call to proceed; and
concurrent with transmitting the acknowledgment comprising the SIP OK message to the computing device that causes the incoming call to proceed, send, based on the SIP notify message, caller identification information to the subscriber destination device.

13. The computing system of claim 12, wherein the one or more processor devices are further configured to:
perform, based on a phone number associated with the wireless user equipment, a lookup of routing information associated with the subscriber destination device; and
send, based on the routing information, the caller identification information to the subscriber destination device.

14. The computing system of claim 13, wherein the one or more processor devices are further configured to:
extract the phone number from the SIP notify message, wherein the subscriber information comprises the phone number.

15. The computing system of claim 12, wherein the one or more processor devices are further configured to:
extract the caller identification information from the SIP notify message.

16. The computing system of claim 12, wherein to send, based on the SIP notify message, the caller identification information to the subscriber destination device, the one or more processor devices are further configured to transmit the caller identification information to the subscriber destination device to facilitate display of the caller identification information on the subscriber destination device.

17. A non-transitory computer-readable storage medium that includes executable instructions configured to cause a processor device to:
receive, from a computing device configured to receive a notification of an incoming call to wireless user equipment, a session initiation protocol (SIP) notify message that includes subscriber information;

transmit, based on the SIP notify message, an acknowledgment comprising an SIP OK message to the computing device that causes the incoming call to proceed; and concurrent with transmitting the acknowledgment comprising the SIP OK message to the computing device that causes the incoming call to proceed, send, based on the SIP notify message, caller identification information to a subscriber destination device.

18. The non-transitory computer-readable storage medium of claim 17, wherein the instructions are further to cause the processor device to:

perform, based on a phone number associated with the wireless user equipment, a lookup of routing information associated with the subscriber destination device; and send, based on the routing information, the caller identification information to the subscriber destination device.

\* \* \* \* \*